United States Patent
Trifilio et al.

(10) Patent No.: US 8,950,991 B2
(45) Date of Patent: Feb. 10, 2015

(54) SCREW CAPTIVATOR

(75) Inventors: Christian Richard Trifilio, St. Paul, MN (US); Timothy Andrew Bachman, St. Paul, MN (US); Matthew Vail Leyden, St. Paul, MN (US); Nathan Lee Schlueter, Bloomington, MN (US)

(73) Assignee: Primordial Soup, LLC, St. Paul, MN (US)

( * ) Notice: Subject to any disclaimer, the term of this patent is extended or adjusted under 35 U.S.C. 154(b) by 342 days.

(21) Appl. No.: 13/273,171

(22) Filed: Oct. 13, 2011

(65) Prior Publication Data

US 2012/0093609 A1    Apr. 19, 2012

Related U.S. Application Data

(60) Provisional application No. 61/344,802, filed on Oct. 13, 2010.

(51) Int. Cl.
*F16B 37/04*    (2006.01)

(52) U.S. Cl.
USPC .......................................... 411/103; 411/107

(58) Field of Classification Search
USPC .................................. 411/103, 107
See application file for complete search history.

(56) References Cited

U.S. PATENT DOCUMENTS

| | | | |
|---|---|---|---|
| 2,831,520 A | 4/1958 | Clarke | |
| 2,922,456 A * | 1/1960 | Myron Kann | 411/353 |
| 3,245,450 A | 4/1966 | Sauter | |
| 3,346,032 A | 10/1967 | Gulistan | |
| 3,465,803 A | 9/1969 | Ernest | |
| 4,915,557 A * | 4/1990 | Stafford | 411/107 |
| 5,336,028 A * | 8/1994 | Yamamoto | 411/107 |
| 5,338,139 A * | 8/1994 | Swanstrom | 411/353 |
| 5,382,124 A * | 1/1995 | Frattarola | 411/352 |
| 5,544,992 A * | 8/1996 | Ciobanu et al. | 411/353 |
| 5,743,692 A | 4/1998 | Schwarz | |
| 5,785,449 A * | 7/1998 | DiBene | 403/343 |
| 6,280,132 B1 * | 8/2001 | Szczukowski et al. | 411/353 |
| 6,468,011 B2 * | 10/2002 | Mayer | 411/353 |
| 6,644,903 B1 * | 11/2003 | Arand | 411/352 |
| 6,884,014 B2 * | 4/2005 | Stone et al. | 411/352 |
| 7,938,607 B2 * | 5/2011 | Wang | 411/107 |
| 8,066,461 B2 * | 11/2011 | Travers | 411/352 |
| 2004/0240962 A1 | 12/2004 | Teng et al. | |
| 2011/0135422 A1 | 6/2011 | Liu | |
| 2011/0188969 A1 | 8/2011 | Michalic et al. | |

* cited by examiner

*Primary Examiner* — Gary Estremsky

(74) *Attorney, Agent, or Firm* — Briggs and Morgan, P.A.

(57) ABSTRACT

A device for captivating a variety of fasteners relative to a first member. A captivator includes a body adapted to be secured to the first member and a retainer received within the body and having a surface engaging a captured fastener. Together the body and retainer maintain the captivated fastener in place relative to the first member. Keyway surfaces are provided upon the body or retainer or both and an external or internal key engages the keyway surfaces to selectively lock the body and retainer together, such as during installation or replacement of the captured fastener. Upon removal of the key, the retainer is free to rotate and translate relative to the body.

20 Claims, 21 Drawing Sheets

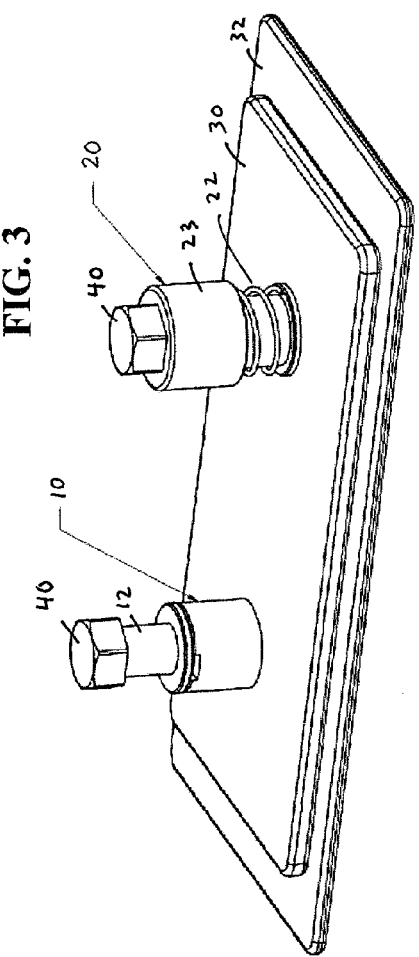
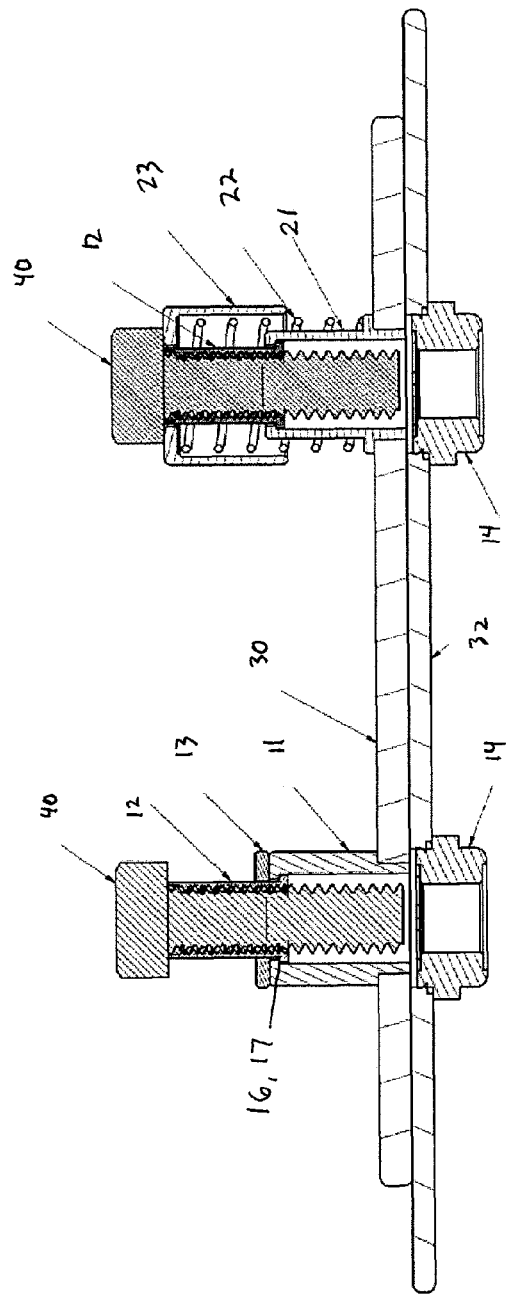
FIG. 3
FIG. 4

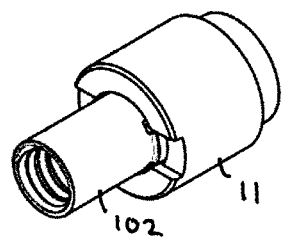
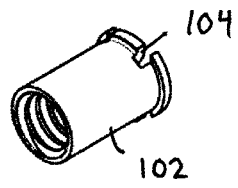
FIG. 23  FIG. 24
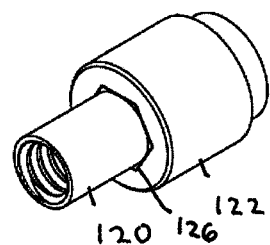
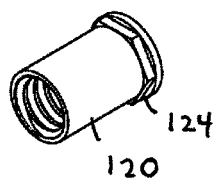
FIG. 25  FIG. 26
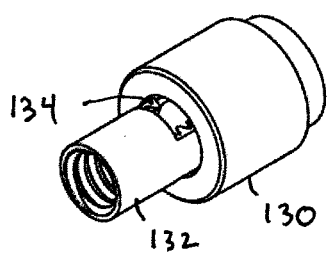
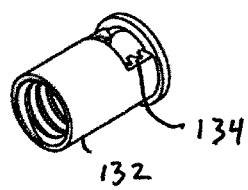
FIG. 27  FIG. 28

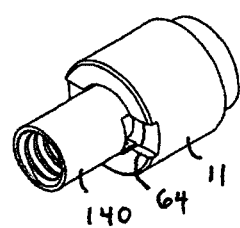
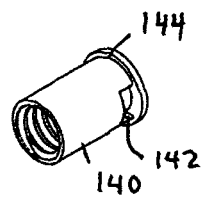
FIG. 29　　　　　　　　FIG. 30
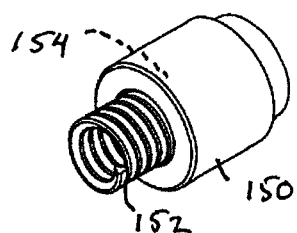
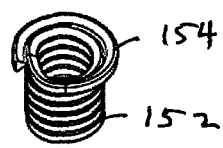
FIG. 31　　　　　　　　FIG. 32
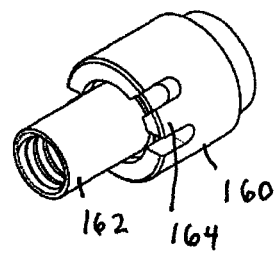
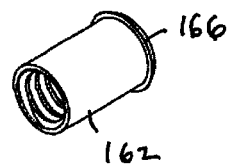
FIG. 33　　　　　　　　FIG. 34

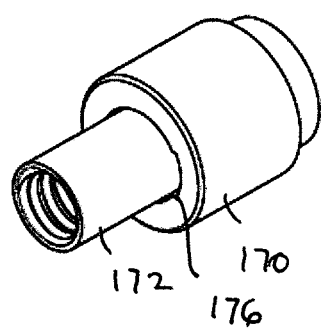 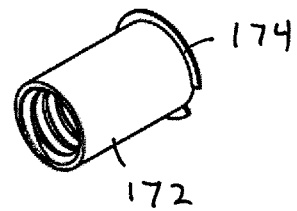
FIG. 35　　　　FIG. 36

FIG. 38
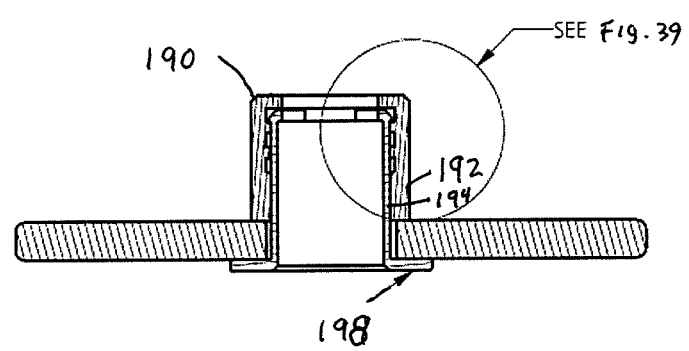
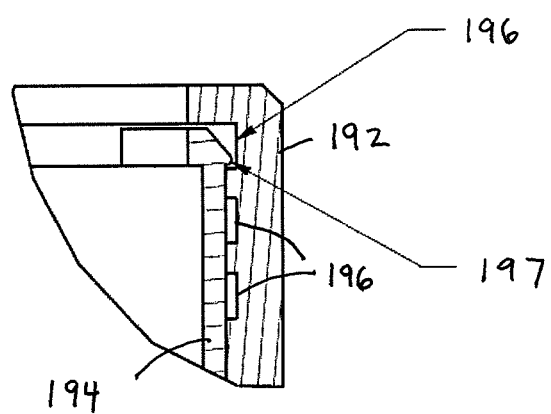
FIG. 39

SCREW CAPTIVATOR

RELATED APPLICATIONS

This application claims the benefit of U.S. Provisional Application Ser. No. 61/344,802, filed Oct. 13, 2010, and incorporated herein by reference.

FIELD OF THE INVENTION

The invention relates to fasteners, and more particularly, to a captive screw-type fastener assembly for securing together a pair of members, and where the fastener is retained in position on one of the members to be secured, when disconnected.

BACKGROUND OF THE INVENTION

Broadly, captive fastener assemblies are well known, including but not limited to a variety of captive screw devices. Many of these assemblies are relatively complex and consist of customized components. Reliability, ease of operation and overall efficiency of known fastener assemblies is often inadequate. For example, the screws used in many known fastener assemblies are custom machined components which add to costs and limit the applicability of a given assembly. Because of the customized nature of prior captive screw assemblies, a significant inventory of component parts is often required to accommodate different captive screw requirements. Furthermore, additional machinery and effort are ordinarily required to affix captive screw assemblies. Interchangeability of known assemblies has also been limited. Still further, many captive screw assemblies have inseparable components and field repair is difficult if not unfeasible. Often an entire panel or subassembly must be returned to a shop for repair or replacement when the captive screw is damaged.

Thus, a need remains for a screw captivator providing improved reliability, ease of operation, and overall efficiency. A need also exists for a system of screw captivators consisting of modular components and suitable for use with conventional threaded fasteners.

SUMMARY OF THE INVENTION

The present invention provides a screw captivator that is both simple and economical to manufacture, and readily installed and used. The captivator avoids extraneous parts and cumbersome connections. The present invention also provides a system of screw captivators utilizing modular components suitable for use with conventional threaded fasteners. In this manner, a system of relatively few components can captivate a vast array of screws or other threaded fasteners. A screw captivator of the present invention provides a simplified installation procedure and reduces the cost of the use of the captivators of this invention.

The present invention relates to a screw captivator useful, for example, to secure together a pair of members, such as panels. For example, in operation the panels are brought together with the bottom surface of the upper panel being flush with the top surface of the lower panel. Mounted upon the top surface of the upper panel is a captured screw with a threaded shaft of the screw capable of protruding beyond the bottom surface of the upper panel so as to engage a nut or other threaded aperture of the lower panel. By tightening the captive screw, the panels are secured together.

To use an example of a screw captivator of the present invention, the upper panel is prepared by drilling or punching a hole or slot of a selected diameter. A counter bore may be drilled or a dimple may be formed on the bottom side of the upper panel, to accommodate connection of a body to the upper panel. A threaded retainer is then passed into the body and is sized to engage the captive screw. A tool may be used to engage and lock the body and retainer together while the screw to be captured is threaded into the retainer. The tool may be an external, hand-graspable tool having a keyed end adapted to engage keyway surfaces of the body or retainer or both. Alternatively, either the body or retainer may incorporate a tool, such as a keyed surface, to engage a keyway and lock the body and retainer together while the captive screw is threaded into the retainer. A variety of different keys and keyways are disclosed herein. In one embodiment, the key is provided on the distal end of an external tool which is inserted into the body from the underside of the top panel. The tool includes a cylindrical receptacle for receiving a portion of the captive screw shaft during assembly. Once the retainer and captive screw are connected, the tool can be withdrawn to permit free rotation between the body and the retainer/captive screw.

One object of the invention is to provide a captivator capable of capturing a wide variety of common, conventional threaded fasteners. Another object of the invention is to provide a system of screw captivators which significantly reduces the number of component parts necessary to capture a wide variety of threaded fasteners. A significantly smaller inventory of component parts would be needed to accommodate a variety of threaded fasteners as compared to systems of the prior art.

Another object of the invention is to provide a captivator with a self-ejecting feature using an ejection spring. The ejection spring can be protected from hostile environments when the captive screw is fastened.

A further object of the invention is to provide a screw captivator which is simple, rugged, small in size and suitable for low-cost mass production.

Other purposes will appear in the ensuing specification, drawings and claims. The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In the accompanying drawings which form part of the specification and wherein like numerals and letters refer to like parts wherever they occur.

FIG. 3 is a perspective illustration of the screw captivators of FIG. 1 shown in an extended or retracted orientation.

FIG. 4 is a cross-sectional view of the screw captivators of FIG. 3.

FIGS. 23 and 24 are perspective views of a second embodiment of the body and retainer components of a screw captivator in accordance with the present invention.

FIGS. 25 and 26 are perspective views of a third embodiment of the body and retainer components of a screw captivator in accordance with the present invention.

FIGS. 27 and 28 are perspective views of a third embodiment of the body and retainer components of a screw captivator in accordance with the present invention.

FIGS. 29 and 30 are perspective views of a fourth embodiment of the body and retainer components of a screw captivator in accordance with the present invention.

FIGS. 31 and 32 are perspective views of a fifth embodiment of the body and retainer components of a screw captivator in accordance with the present invention.

FIGS. 33 and 34 are perspective views of a sixth embodiment of the body and retainer components of a screw captivator in accordance with the present invention.

FIGS. 35 and 36 are perspective views of a seventh embodiment of the body and retainer components of a screw captivator in accordance with the present invention.

FIG. 38 is a cross-sectional view taken through a body component of an alternative embodiment of a screw captivator.

FIG. 39 is a detailed view of FIG. 38 depicting the connection between a base and retainer elements of the body component of FIG. 38.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
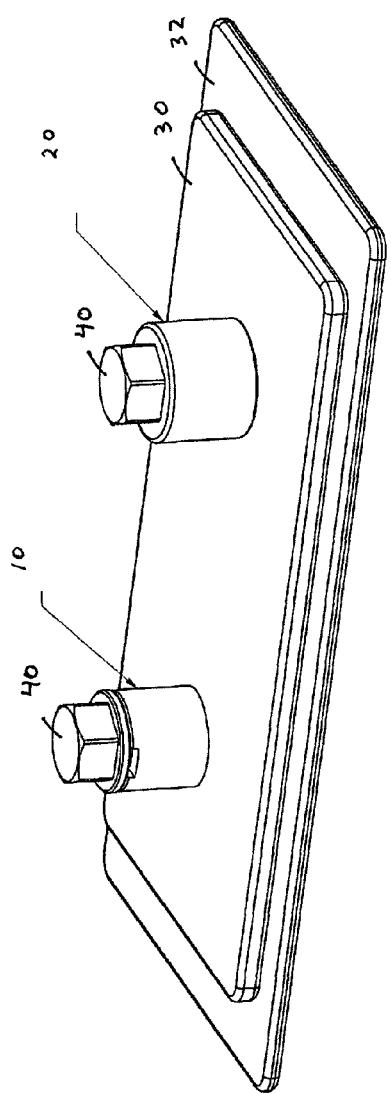
FIG. 1 is a perspective illustration of a pair of screw captivators in accordance with the present invention.

Referring now to FIG. 1, two embodiments of the present invention are illustrated as screw captivators 10, 20 for securing together two elements, such as plate or panel members 30, 32, via a captured screw 40. The configuration of members 30, 32 may be widely varied and need not constitute plate members. The present invention can thus be adapted to secure together a wide variety of elements, such as plates, panels, frames, etc. For simplicity's sake member 30, 32 will simply be referred to as panels in this description.

Figure 2:
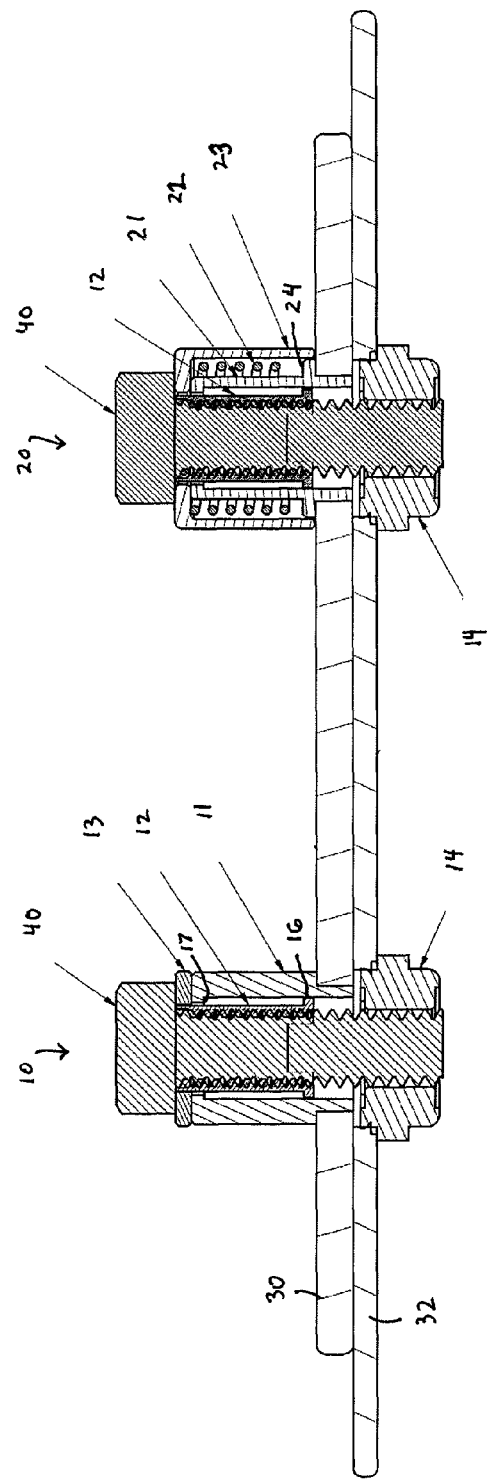
FIG. 2 is a cross-sectional view of the screw captivators of FIG. 1.

In one application of the invention, panel 30 may be a removable panel and panel 32 may be a frame or body. FIGS. 1 and 2 illustrate the screw captivators 10, 20 as connecting panels 30, 32. FIGS. 3 and 4 illustrate the screw captivators in retracted (non-connected) configurations.

FIG. 2 is a cross-sectional view of FIG. 1, where screw captivator 10 is a non-spring loaded assembly. In comparison, screw captivator 20 of FIG. 3 includes a spring 22 which biases the captured screw 40 upwardly so as to retract a threaded end of the captive screw 40. Depending on the length of the screw 40, the threaded end of screw 40 may be fully retracted into the assembly 20, thereby precluding scratching or damaging the underlying member 32. When the threaded end of captive screw 40 is released from panel member 32 it is thus automatically retracted and can be made to entirely enter the body 21. Such full retractability means that the panels 30, 32 can be essentially flush against each other prior to tightening down of the captive screw 40.

Screw captivator 10 includes body 11, retainer 12 and washer 13 (optional). For illustration purposes, captive screw 40 is shown as a simple hex-headed screw fastener adapted to engage a nut 14 of panel 32. As described in detail hereinafter, captive screw 40 may assume a variety of shapes, size and configurations including non-headed fasteners, simple threaded shanks, handles, knobs, etc.

In this assembly, body 11 secures the captured screw 40 to panel member 30. The retainer 12 is a cylindrical element having an outwardly projecting flange 16 at one end. This is for engagement with an inwardly extending flange 17 on the body 11 when the two parts are fitted together. In other words, when the retainer 12 is received into the body 11, it can slide relative to the body 11, but axial movement in one direction is limited by the flanges 16, 17.

Body 11 may be secured to panel member 30 via welding, adhesive, mechanical deformation, etc., or may be freely disassociated from member 30. In one embodiment, body 11 includes an end which is swaged to secure body 11 to member 30. In another embodiment, body 11 can be secured to panel 30 via a floating connection. For example, body 11 can be secured so as to permit movement within an elongate slot.

Body 11 could also be secured to panel 30 via a snap-fit structure, such as described herein with reference to FIGS. 38 and 39.

Retainer 12 captivates screw 40 within body 11. As described in more detail hereinafter, when fitted together flange 16 of retainer 12 cooperates with flange 17 of body 11 to precludes screw 40 from detaching from body 11. When screw 40 is retained by retainer 12, it can move relative to the body 11, but axial movement in one direction is limited by contact between flanges 16, 17 so as to prevent detachment. Flanges 16, 17 thus act to captivate the captive screw 40 while still allowing unrestricted rotation of the captive screw 40.

Washer 13 is optional and provides a means for facilitating the rotation of the screw head relative to the body 11. A variety of washer styles (e.g., split, configured, flat) could be utilized as dictated by a given application.

Panel nut 14 may be secured to the underside of panel member 32 via welding, adhesive, deformation, etc. or may be freely disassociated with member 32. In alternative embodiments, panel nut 14 can be replaced with a simple aperture which need not even contain internal threads. For illustration purposes, panel nut 14 of FIG. 2 simply provides an internally-threaded element which is engaged by the captive screw assembly 10 to secure the panels 30, 32 together.

The second embodiment of screw captivator 20 includes body 21, spring 22, cover 23, retainer 12 and panel nut 14. Body 21 may be secured to panel member 30 via welding, adhesive, deformation, etc. or may be freely disassociated from member 30. In one embodiment, body 11 includes an end which is swaged to secure body 11 to member 30.

Spring 22 biases the assembly to a retracted orientation as shown in FIGS. 3 and 4. One end of spring 22 engages a flange 24 on body 21 and the end of spring 22 engages the underside of cover 23. In other embodiments, the spring 22 could engage the top surface of panel 30. To promote a compact assembly, spring 22 is a helical coil having a diameter greater than the diameter of body 21.

Cover 23 is a generally open ended cylinder functioning to shield debris and conceal spring 22 and also act as a flat wash for screw 40. Cover 23 is optional and in embodiments not having cover 23, spring 22 may engage the underside of screw 40 (or handle, knob, etc.) or be replaced by a flat washer. Cover 23 may include knurling or other surface texture or configurations.

Figure 5:
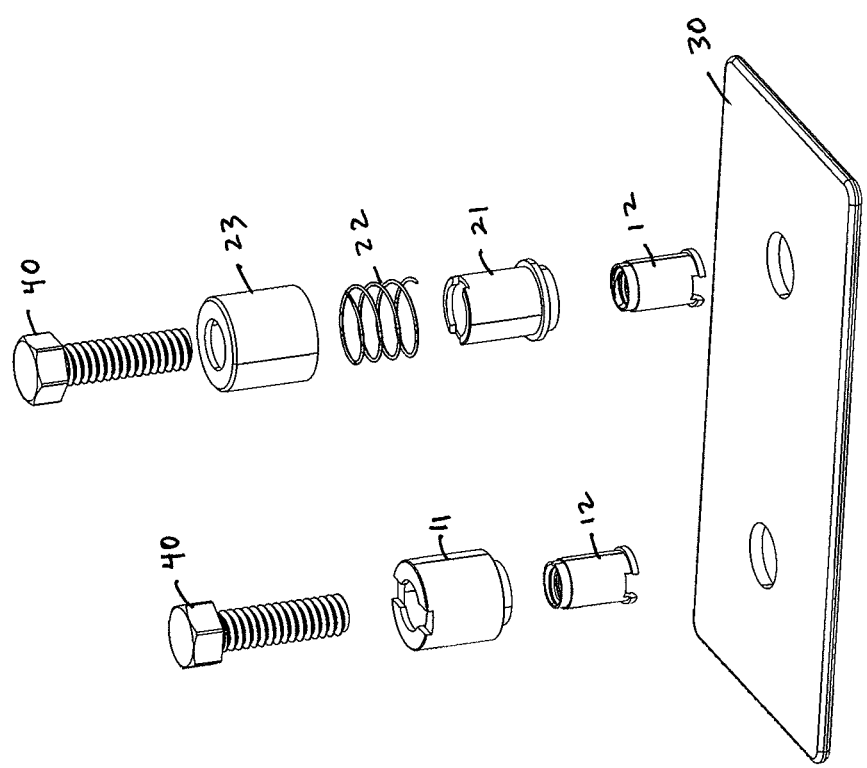
FIG. 5 is an exploded perspective view of the screw captivators of FIG. 1
Figure 6:
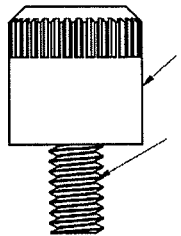
FIG. 6 is a plan view of a cap screw and cover suitable for use with the screw captivator of FIG. 1.
Figure 7:
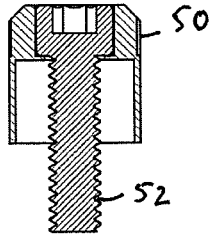
FIG. 7 is a cross-sectional view of the screw of FIG. 6.
Figure 8:
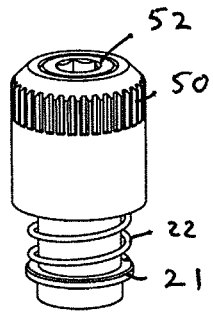
FIG. 8 is a perspective view of a screw captivator utilizing the cap screw and cover of FIG. 6.
Figure 9:
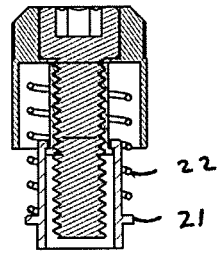
FIG. 9 is a cross-sectional view of the screw captivator of FIG. 8.

FIG. 5 illustrates components of the screw captivator 10, 20 in an exploded perspective view.

FIGS. 6 through 9 illustrate another embodiment of cover 50 wherein a conventional socket head cap screw 52 is received within cover 50. Cap screw 52 may be press-fit into engagement with cover 50 or be secured by adhesive. In another embodiment, cover 50 could be larger and form a hand-graspable knob.

Figure 10:
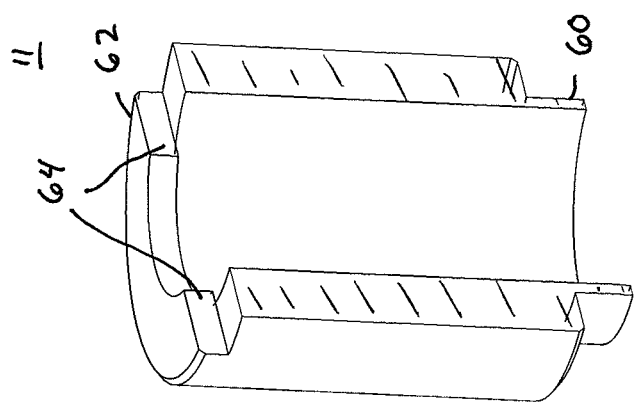
FIG. 10 is a cross-sectional view of a body component of the screw captivator of FIG. 1.
Figure 11:
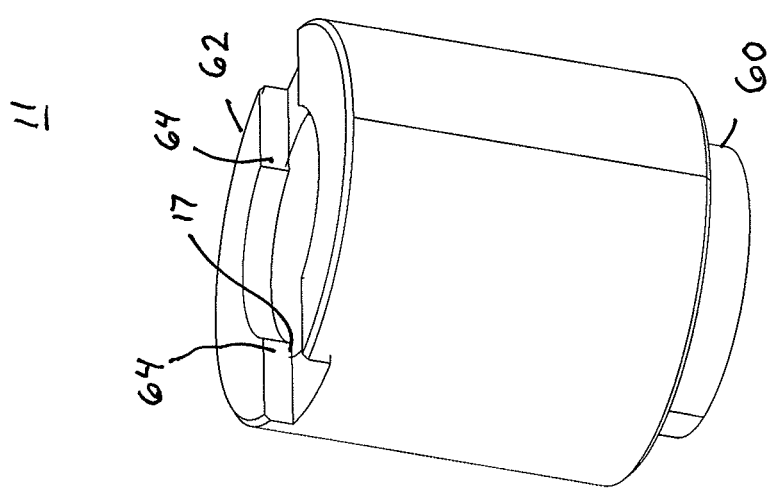
FIG. 11 is a perspective view of the body component of FIG. 10.
Figure 12:
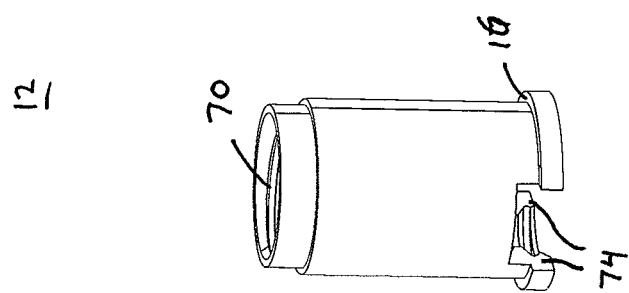
FIG. 12 is another perspective view of the body component of FIG. 10.
Figure 13:
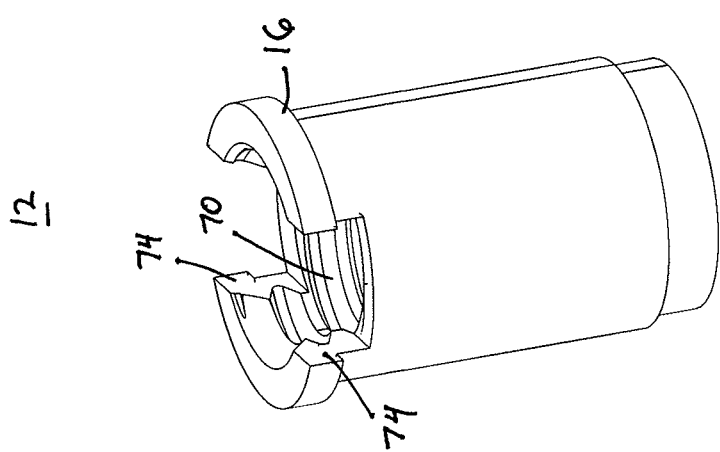
FIGS. 13, 14 and 15 are yet other perspective views of the body component of FIG. 10.
Figure 14:
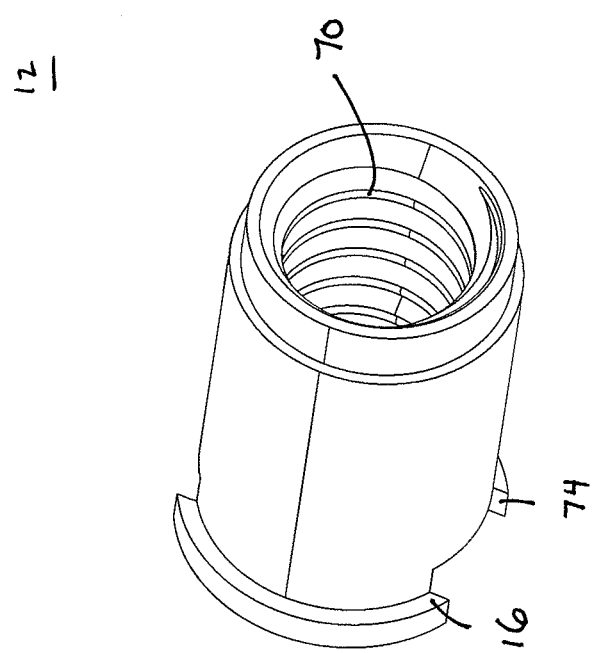
Figure 15:
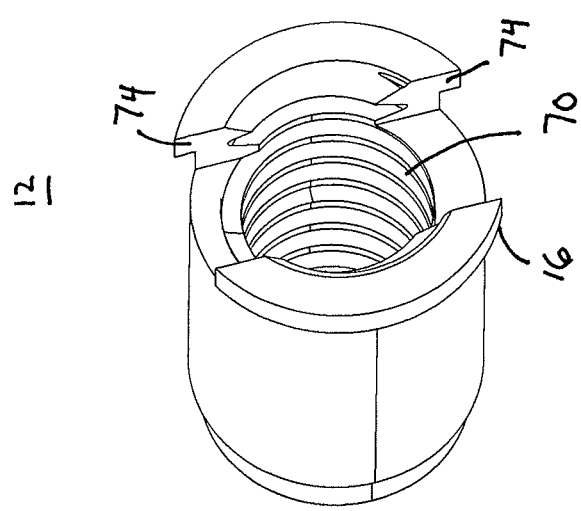

Referring now to FIGS. 10 and 11, details of body 11 will be discussed. Body 11 is generally cylindrical in form and includes a first end 60 adapted to receive retainer 12. Second end 62 includes flange structure 17 for engaging flange structure 16 of retainer 12 thereby limiting axial displacement of the retainer relative to body 11. First end 60 may include an annular narrowing size to be received within a panel aperture. The first end 60 may be deformed, such as via a swaging process, to secure the body 11 to a panel. In other embodiments, body 11 may be welded or otherwise mechanically coupled to a panel. While body 11 is illustrated as a generally cylindrical form, alternative embodiments of body 11 could assume a variety of other forms.

A portion of body 11 defines keyway surfaces 64 which are engaged by a keyed tool as described hereinafter. The keyed tool is utilized during assembly/disassembly of the captive screw assembly 10. A variety of different keyway surfaces may be provided upon body 11 as described herein with reference to FIGS. 23 through 26.

Referring now to FIGS. 12 through 15, retainer 12 is shown in various views. Retainer 12 is generally cylindrical in form and includes interior threading 70 and flange structure 16 at one end. Interior threading 70 is adapted to engage threading on the screw 40 to be captured. The interior threading 70 need to extend the full length of retainer 12. Various thread sizes, pitches and configurations are envisioned for a family of retainers 12 to accommodate various screw sizes and pitches. In addition, the upper end of the retainer 12 may be relieved to allow the retainer to thread up a screw 40 that is not fully threaded. Also, the upper end of the retainer 12 may have external relief so that a standard flat washer may slide over it. Retainer 12 is sized for axial movement within body 11 with flange structure 16 preventing detachment of retainer 12 from body 11.

The connection between retainer 12 and captive screw 40 may be further secured with an adhesive, such as a thread locking compound, to inhibit loosening. In another embodiment, retainer 12 may include other thread-locking structures such as a deformable polymer tip, asymmetric threading, lock washers, etc. In one embodiment, the end of retainer 12 may be designed to deform upon contact with the captive screw 40 to further lock the components together.

A portion of retainer 12 defines keyway surfaces 74 which are also engaged by a keyed tool during installation or repair. As described hereinafter, the keyed tool engages the keyway surfaces 64 and 74 of body 11 and retainer 12, respectively, to lock the body 11 and retainer 12 together so as to facilitate coupling the retainer 12 onto the screw 40.

Figure 16:
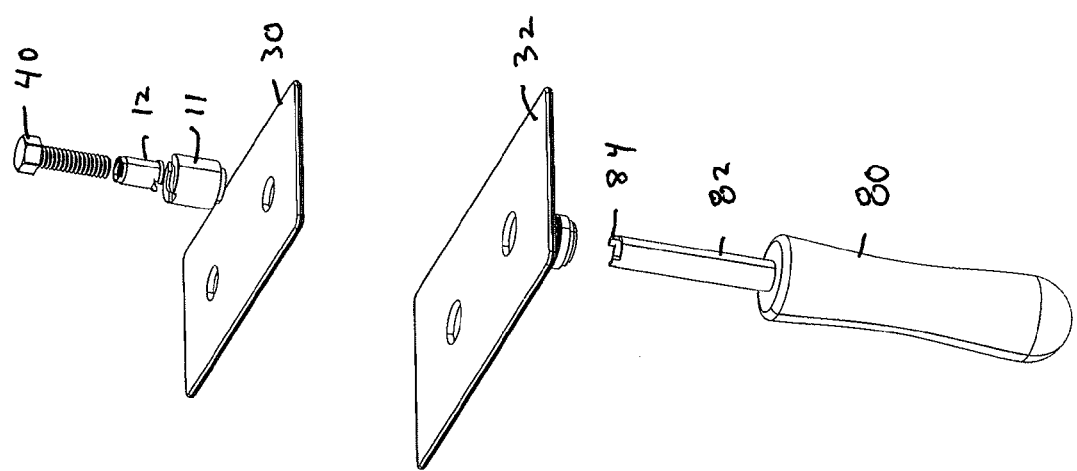
FIG. 16 is an exploded perspective view of the screw captivator of FIG. 1 including an assembly tool.
Figure 17:
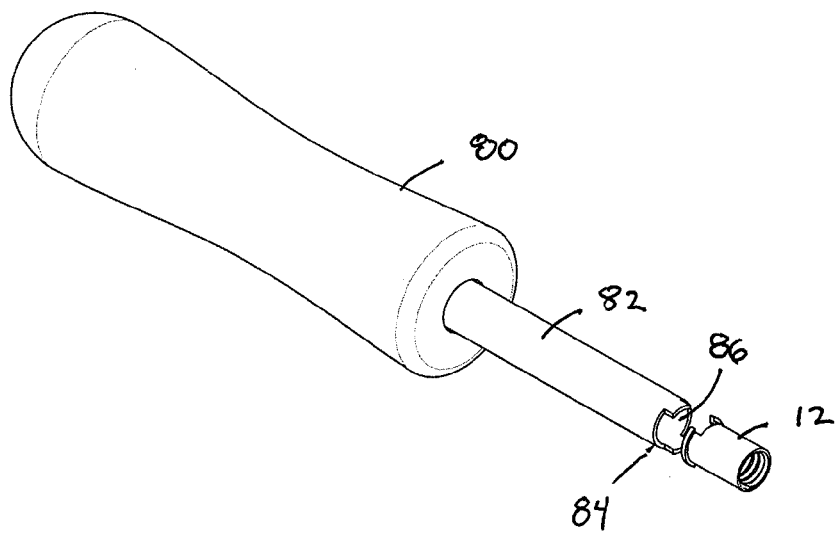
FIG. 17 is a perspective view of the assembly tool of FIG. 16 along with a retainer component of the screw captivator.

Referring now to FIGS. 16 and 17, an embodiment of a keyed tool 80 adapted for use with the body 11 and retainer 12 of FIGS. 1-4 is illustrated. Tool 80 includes a hand graspable handle attached to shaft 82 having a keyed end 84. Keyed end 84 includes a generally cylindrical receptacle 86 sized to receive a shaft of captive screw 40. Keyed end 84 further includes key surfaces adapted to engage keyway surfaces 64, 74 of body 11 and retainer 12, respectively. In this embodiment, keyed end 84 is a simple bifurcation of a hollow end of shaft 82.

Figure 18:
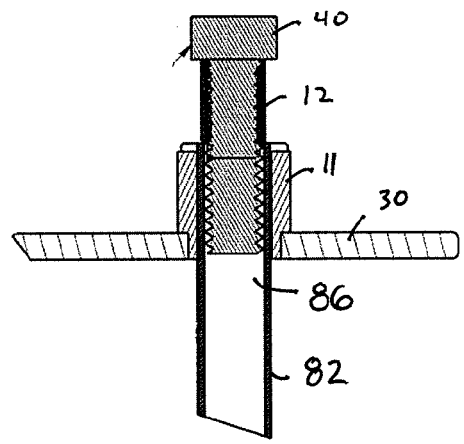
FIG. 18 is a cross-sectional view of a screw captivator and assembly tool as depicted during an assembly process.
Figure 19:
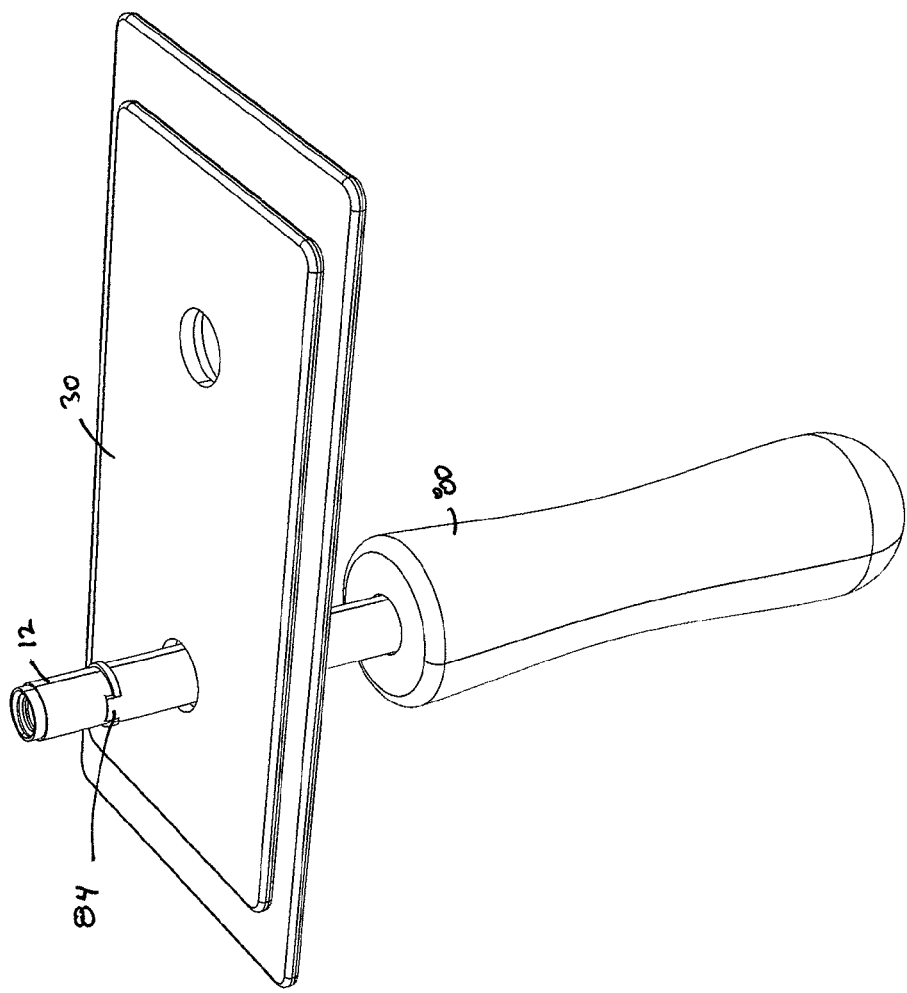
FIG. 19 is a perspective view of the assembly tool, panel members and retainer components of the screw captivator of FIG. 1.

As shown in FIG. 18, the keyed end 84 of tool 80 is inserted into the first end 60 of body 11 during installation. A shaft portion of captive screw 40 received into receptacle 86. As tool 80 is inserted into body 11 and rotated as needed, keyed end 84 engages the keyway 74 of retainer 12, as shown in FIG. 19 (body 11 removed from view).

Figure 20:
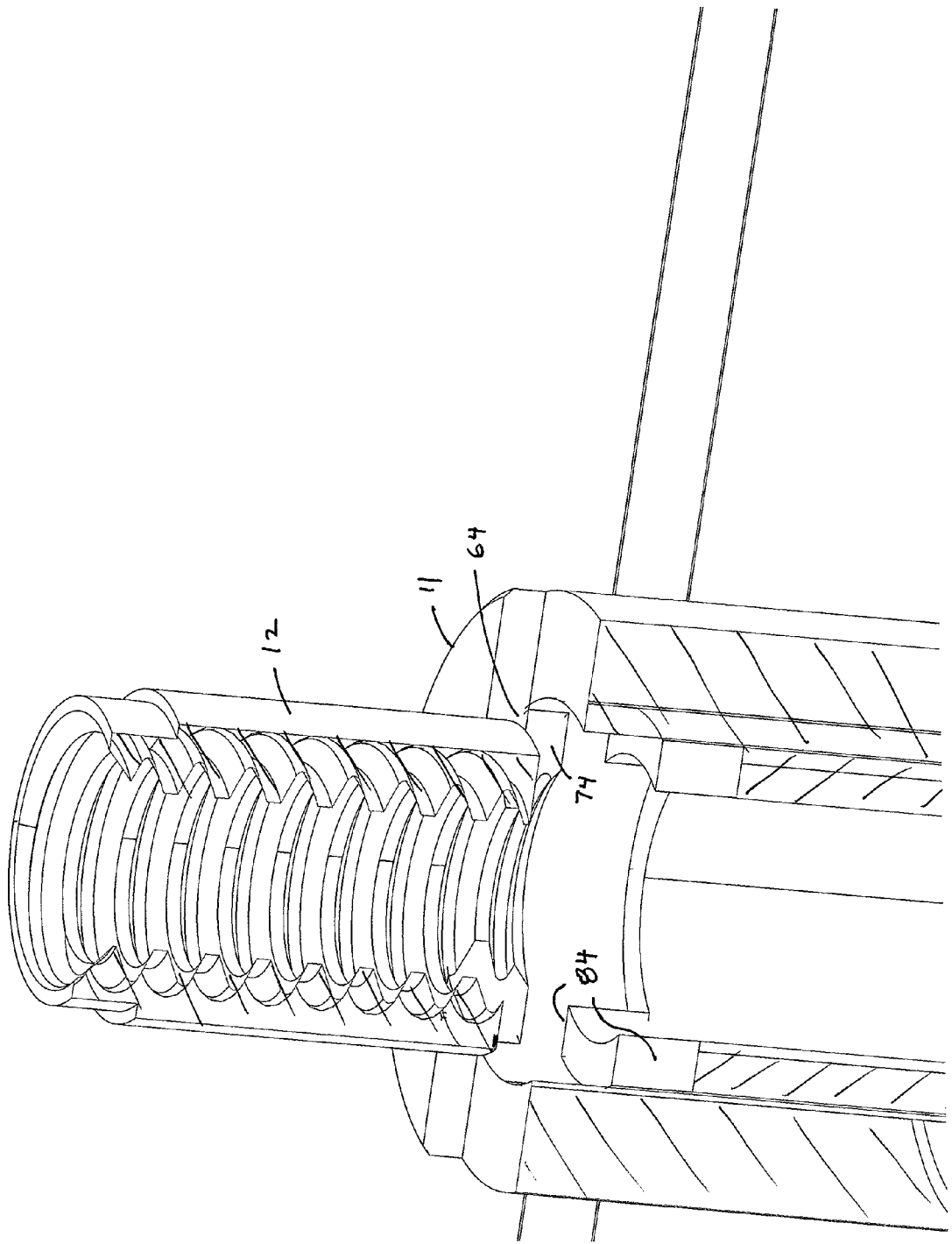
FIG. 20 is a cross-sectional view of the assembly tool, captive fastener, retainer and body components of the screw captivator of FIG. 1.
Figure 21:
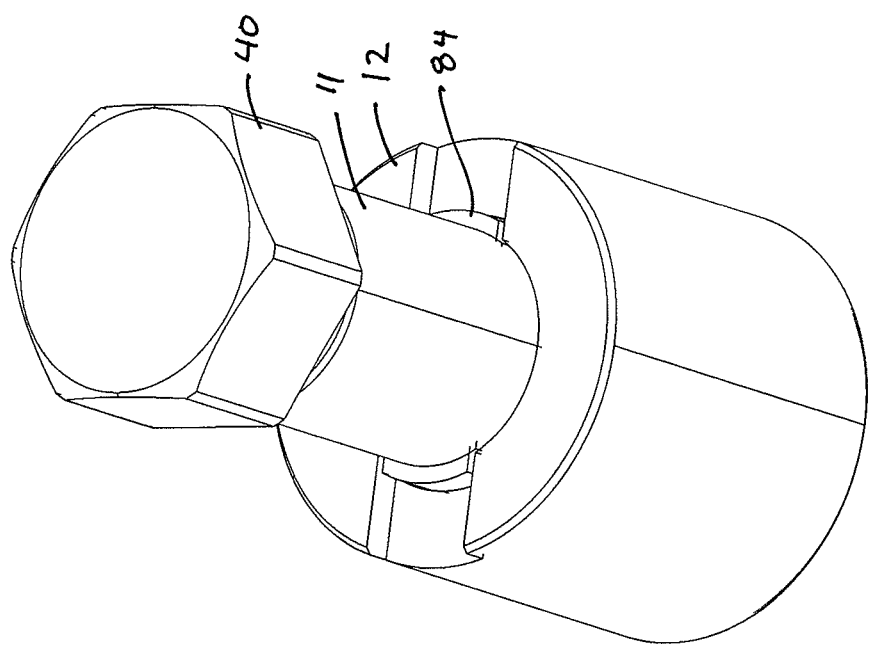
FIG. 21 is a perspective view of a captive screw, body and retainer components and assembly tool.
Figure 22:
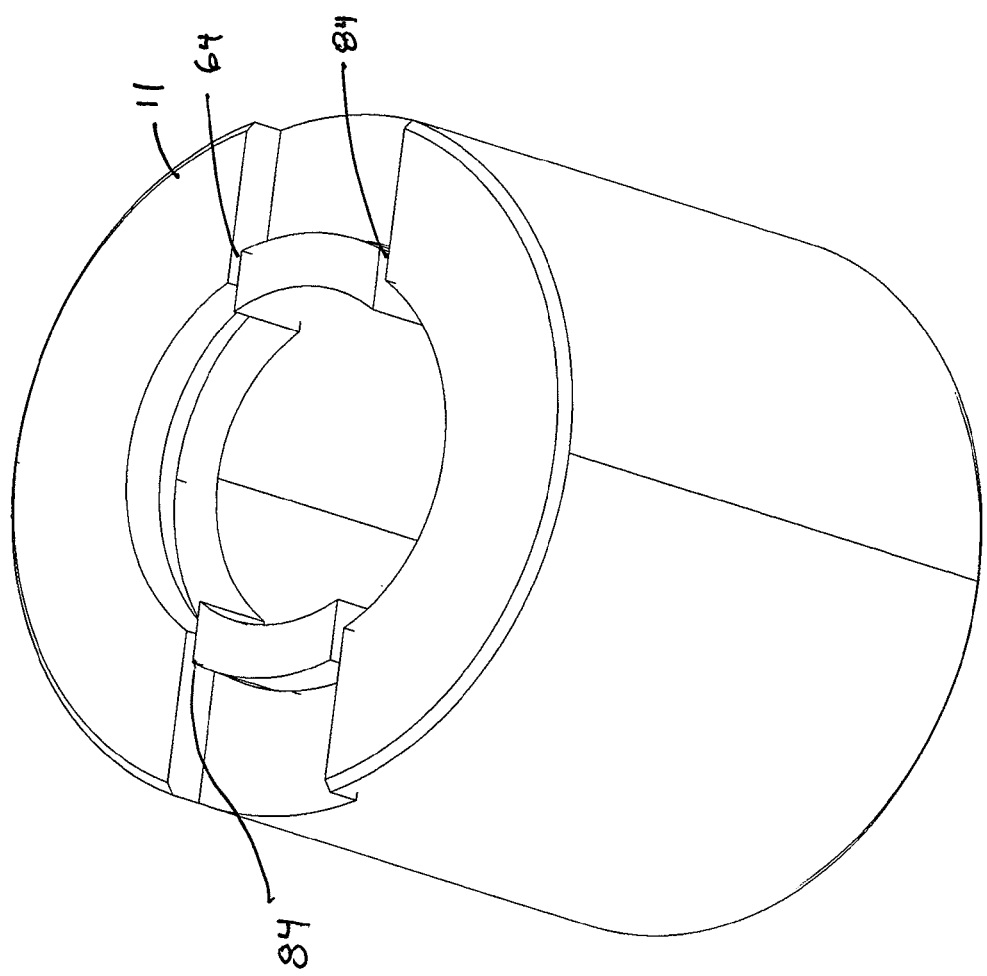
FIG. 22 is a perspective view of the body component of the screw captivator of FIG. 1 and the assembly tool.

FIG. 20 is a cutaway illustration showing the tool end 84 just prior to contact with the keyway surfaces 64, 74 of body 11 and retainer 12. As tool 80 is further inserted and rotated into body 11, keyed end 84 then engages keyway 64 of body 11 as shown in the detailed view of FIG. 21. Body 11 and tool 80 are separately shown in FIG. 22 to illustrate the coupling between keyed end 84 and keyway surfaces 64 of body 11.

With tool 80 fully inserted to engage the keyway surfaces 64, 74 of body 11 and retainer 12, the components are locked together. Captive screw 40 can then be secured to retainer 12 by rotation of captive screw 40 relative to retainer 12. The tool 80 thus provides an interface to both force the retainer 12 out of body 11 and also lock the body 11 and retainer 12 together while the captive screw is rotated into engagement with retainer 12. With the hand-graspable version of tool 80, torque applied to captive screw 40 is resisted by the coupling between the body 11 and panel 30 or transferred to the tool handle. If the body 11 is loosely secured to panel 30, torque applied to captive screw 40 is counteracted with torque applied to tool 80. Once tool 80 is removed, retainer 12 is unlocked from body 11 and the captive screw 40 and retainer 12 are free to rotate relative to body 11.

FIGS. 23 and 24 illustrate another embodiment of a retainer 102 suitable with use with body 11. In this embodiment, retainer 102 defines a keyed surface 104 which engages the keyway 64 of body 11, thus allowing for assembly without an external tool. In operation, the retainer 102 is axially displaced within body 11 so that keyed surface 104 engages keyway 64 of body 11, thereby locking the body 11 and retainer 102 together as the captive screw 40 is secured to retainer 102. Once retainer 102 is displaced away from the keyway 64, the body 11 and retainer are unlocked and the captive screw 40 and retainer are free to rotate relative to body 11.

FIGS. 25 and 26 illustrated another embodiment of a retainer 120 suitable for use with a body 122. In this embodiment, retainer 120 defines a keyed surface 124 which engage keyway surfaces 126 of body 122. Keyed surface 124 has a hexagonal form which engages a corresponding hex-shaped keyway 126. In operation, the retainer 120 is axially displaced within body 122 so that keyed surface 124 engages keyway surfaces 126 of body 122. Once retainer 120 is axially displaced away from keyway surfaces 126, the body 122 and retainer 120 are unlocked and the captive screw 40 and retainer are free to rotate relative to body 122. A variety of different key and keyway surfaces are envisioned on body and retainer components of the present invention.

FIGS. 27 and 28 illustrate another body 130 and retainer 132 for use with an external tool (not shown) for holding the retainer 132 as the captive screw 40 is inserted into retainer 132. Retainer 132 has one or more flats 134 adapted to be engaged by an external wrench or other tool.

FIGS. 29 and 30 illustrate another retainer 140 for use with body 11. Keyway surfaces 142 are defined upon retainer 140 away from flange 144. A rectangular aperture in retainer 140 forms the keyway surfaces 142. Other aperture configurations would also be practicable. An external keyed tool (not shown) can engage keyway surfaces 64, 142 so as to lock the body 11 and retainer 140 together during assembly.

FIGS. 31 and 32 illustrate another body 150 and retainer 152. Retainer 152 can be a spiral-formed wire component having an enlarged end 154 sized to prevent detachment of the retainer 152 from body 150. Retainer 152 can be a wire having a triangular cross section formed to conform to threads of the captive screw.

FIGS. 33 and 34 illustrate another body 160 and retainer 162 wherein the retainer 162 snaps into body 160. A deflecting portion 164 of body 160 is adapted to deflect as the flange 166 of retainer 162 is inserted into body 160. In another embodiment the deflecting portion can be provided upon retainer 162.

FIGS. 35 and 36 illustrate another embodiment of a body 170 and retainer 172 wherein the retainer 172 includes a relatively thin, broken flange 174 adapted to pass through a gap 176 in body 170. During assembly, an edge of broken flange 174 is inserted into the gap 176 and the retainer 172 is rotated to pass the flange 174 into the body 170.

Figure 37:
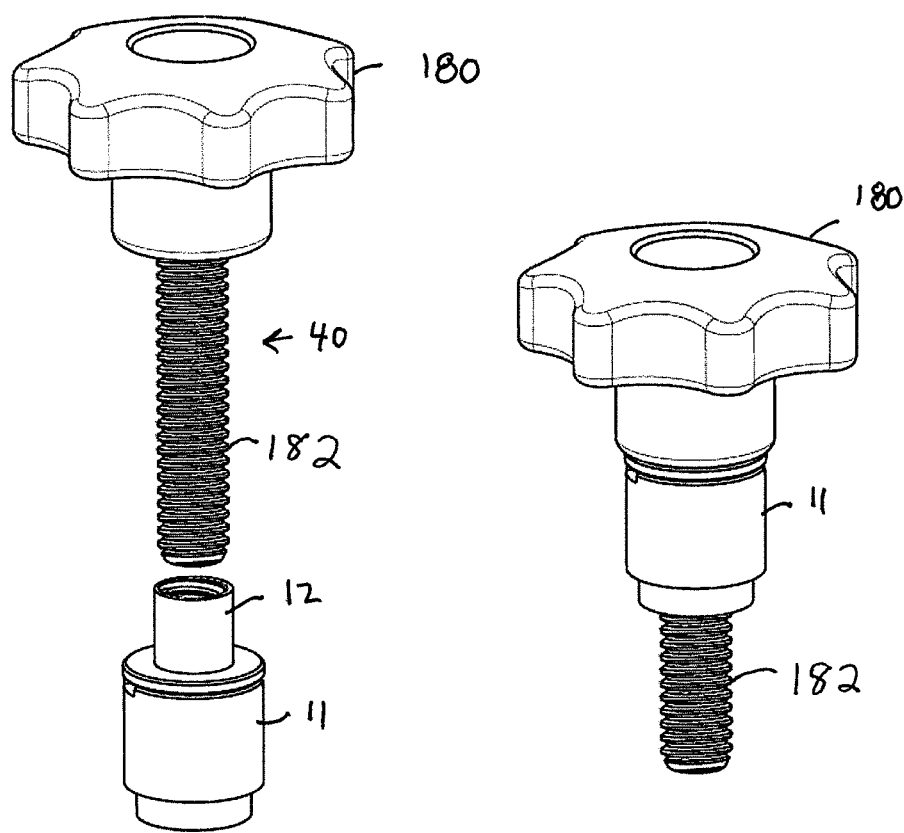
FIG. 37 is a perspective view of a screw captivator in accordance with the present invention.

Captive screw 40 includes a variety of threaded assemblies. For example, FIG. 37 illustrates a captive screw 40 having a hand-graspable knob 180 connected to a threaded shaft 182. In another example, captive screw 40 provides a handle.

An alternative embodiment of a body 190 is illustrated in FIGS. 38 and 39. A two-part body 190 includes a body cap 192 and body base 194 which are snap-fit together during assembly. The body cap 192 and body base 194 define a latch mechanism to secure the portions together. For example, body cap 192 includes a plurality of internal annular grooves 196 which are sized to engage an annular protrusion 197 on body base 194. The plurality of grooves 196 allow the same body cap 192 and body base 194 to accommodate panels 30 of different thickness. The grooves and protrusions need not be continuous. For example, a plurality of disjointed grooves and protrusions could be utilized in another embodiment of body 190. During assembly, the body base 194 is passed through an aperture in panel 30. A flange 198 precludes body base 194 from passing through panel 30.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A device for securing a fastener to a first member comprising:
   a body having a hollow interior and a lower end adapted to be secured to a first member, with an opening in the body at an upper end being defined by a narrowing of the hollow interior, and with an opening in the body at a lower end;
   a retainer positioned within the hollow interior of the body and having an upper portion sized to pass through the opening in the upper end of the body and a lower portion sized to not pass through the opening in the upper end of the body and a threaded interior adapted to engage threads of a threaded fastener;
   a cover having a portion positioned above the body with an upper surface having an aperture larger than a fastener shaft diameter and smaller than a fastener head; and
   a spring, having an opening into which at least portions of the body and retainer are received, wherein a first end of the spring engages a lower portion of the body at a position below the narrowing of the hollow interior and a second end of the spring engages an underside of the cover, biasing the cover away from the first member,
   wherein when the fastener is passed through the cover and is threaded into the retainer the fastener is free to rotate but is limited in axial movement in a first direction by the cover contacting the body or the first member and in a second direction by the lower portion of the retainer contacting the narrowing of the body.

2. The device of claim 1 further comprising a keyway extending through a portion of the body or retainer or both, said keyway adapted to receive a key tool to selectively lock the body and retainer together so as to facilitate the coupling between the fastener and the retainer, and with the key tool removed the body and retainer are free to rotate or translate relative to each other.

3. The device of claim 1 wherein the fastener is secured to the cover.

4. The device of claim 1 wherein the cover is a washer.

5. The device of claim 1 wherein the spring is hidden from view when the cover is pushed downwardly toward contact with the first member.

6. A device for securing a fastener to a first member comprising:
- a body having a hollow interior and a lower end adapted to be secured to a first member, with an opening in the body at an upper end being defined by a narrowing of the hollow interior, and with an opening in the body at a lower end;
- a retainer positioned within the hollow interior of the body and having an upper portion sized to pass through the opening in the upper end of the body and a lower portion sized to not pass through the opening in the upper end of the body and a threaded interior adapted to engage threads of a threaded fastener; and
- a keyway extending through a portion of the body or retainer or both, said keyway adapted to receive a key tool to selectively lock the body and retainer together so as to facilitate the coupling between the fastener and the retainer, and with the key tool removed the body and retainer are free to rotate or translate relative to each other, wherein when the fastener is threaded into the retainer the fastener is free to rotate but is limited in axial movement in a first direction by contact with the body and in a second direction by the lower portion of the retainer contacting the narrowing of the body.

7. The device of claim 6 wherein the key tool includes a bifurcated end.

8. The device of claim 7 wherein bifurcations of the key tool engage a flange structure on the retainer.

9. A device for securing a fastener to a first member comprising:
- a body having a body base and a body cap, with the body base sized to be introduced through an opening in a first member, and with a snap-lock structure including at least one groove in an interior of the body cap which engages at least one protrusion on an exterior surface of the body base, said snap-lock securing the body base and body cap to the first member, said body having a hollow interior and a lower end adapted to be secured to the first member, with an opening in the body at an upper end being defined by a narrowing of the hollow interior, and with an opening in the body at a lower end the body;
- a retainer positioned within the hollow interior of the body and having an upper portion sized to pass through the opening in the upper end of the body and a lower portion sized to not pass through the opening in the upper end of the body and a threaded interior adapted to engage threads of a threaded fastener;
- a cover having a portion positioned above the body with an upper surface having an aperture larger than a fastener shaft diameter and smaller than a fastener head; and
- a spring, having an opening into which at least portions of the body and retainer are received, wherein a first end of the spring engages a lower portion of the body at a position below the narrowing of the hollow interior and a second end of the spring engages an underside of the cover, biasing the cover away from the first member, wherein when the fastener is passed through the cover and is threaded into the retainer the fastener is free to rotate but is limited in axial movement in a first direction by the cover contacting the body or the first member and in a second direction by the lower portion of the retainer contacting the narrowing of the body.

10. The device of claim 9 further including a keyway extending through a portion of the body or retainer or both, said keyway adapted to receive a key tool to selectively lock the body and retainer together so as to facilitate the coupling between the fastener and the retainer, and with the key tool removed the body and retainer are free to rotate or translate relative to each other.

11. A device for securing a fastener to a first member comprising:
- a body having a body base and a body cap, with the body base sized to be introduced through an opening in the first member and the body cap engaging the body base with a snap-lock structure including at least one groove in an interior of the body cap which engages at least one protrusion on an exterior surface of the body base, said snap-lock structure securing the body base and body cap to the first member, with an opening in the body at an upper end being defined by a narrowing of the hollow interior, and with an opening in the body at a lower end; and
- a retainer positioned within the hollow interior of the body and having an upper portion sized to pass through the opening in the upper end of the body and a lower portion sized to not pass through the opening in the upper end of the body and a threaded interior adapted to engage threads of a threaded fastener, wherein when the fastener is passed through the cover and is threaded into the retainer the fastener is free to rotate but is limited in axial movement in a first direction by the cover contacting the body and in a second direction by the lower portion of the retainer contacting the narrowing of the body a hollow interior and a lower end adapted to be secured to a first member.

12. The device of claim 11 with a keyway extending through a portion of the body or retainer or both, said keyway adapted to receive a key tool to selectively lock the body and retainer together so as to facilitate a coupling between the fastener and the retainer, and with the key tool removed the body and retainer are free to rotate or translate relative to each other.

13. The device of claim 12 wherein the key tool includes a bifurcated end, and wherein bifurcations of the key tool engage a flange structure on the retainer or body or both.

14. A device for securing a screw captivator to a first member comprising:
- a body base with an upper end, a lower end and a hollow interior, with an opening in the body base at an upper end being defined by a narrowing of the hollow interior, and with an opening in the body base at the lower end, with the upper end being sized to fit through an opening in the first member and the lower end being sized to not fit though the opening; and
- a body cap sized to cap over a portion of the body base that protrudes above the first member, with at least one groove in the interior of the body cap to engage at least one protrusion on the exterior of the body, and
- wherein when the body is introduced from below through the opening in the first member and received into the body cap, a snap-lock structure secures the body base and the body cap to the first member.

15. The device of claim 14 wherein the snap-lock structure includes a latch mechanism.

16. The device of claim 15 wherein the latch mechanism includes a groove on the cap and a protrusion on the base.

17. The device of claim 16 wherein the latch mechanism includes a protrusion on the base which is formed by bending a tab out of an upper portion of the base.

18. The device of claim 16 wherein the groove is one of a plurality grooves defined upon the cap, with the plurality of grooves allowing the base and cap to be secured to a plurality of first members having different thicknesses.

19. The device of claim 15 wherein the latch mechanism includes a groove on the base.

20. The device of claim 19 wherein the latch mechanism includes a plurality of grooves on the base.

* * * * *